United States Patent [19]

Rietsch

[11] 4,042,910

[45] Aug. 16, 1977

[54] METHOD OF SEISMIC EXPLORATION

[75] Inventor: Eike Rietsch, Celle, Germany

[73] Assignee: Deutsche Texaco Aktiengesellschaft, Hamburg, Germany

[21] Appl. No.: 621,093

[22] Filed: Oct. 9, 1975

[30] Foreign Application Priority Data

Oct. 9, 1974 Germany .............................. 2448007

[51] Int. Cl.$^2$ ........................... G01V 1/14; G01V 1/36
[52] U.S. Cl. ........................... 340/15.5 TA; 340/17 R; 181/113; 181/139
[58] Field of Search ............... 181/106, 113, 119, 121, 181/139, 401; 340/15.5 TA, 17; 73/67.2; 324/83 FE

[56] References Cited

U.S. PATENT DOCUMENTS

| 3,185,958 | 5/1965 | Masterson et al. | 340/15.5 TA |
|---|---|---|---|
| 3,221,298 | 11/1965 | Burns | 340/15.5 TA |
| 3,259,878 | 7/1966 | Mifsud | 181/113 |
| 3,288,243 | 11/1966 | Silverman | 181/401 |
| 3,332,512 | 7/1967 | Sundt | 181/113 |
| 3,375,896 | 4/1968 | Beddo | 181/106 |
| 3,786,409 | 1/1974 | Sorkin | 340/15.5 CC |
| 3,895,343 | 7/1975 | Farr | 340/15.5 TA |

Primary Examiner—Nelson Moskowitz
Attorney, Agent, or Firm—Thomas H. Whaley; Carl G. Ries; Henry C. Dearborn

[57] ABSTRACT

A method of suppressing noise trains that develop from harmonics of a vibrator-type sweep signal. It includes the step of generating a plurality of such sweep signals in series and with the phase of each succeeding sweep signal being shifted relative to the previous one by a predetermined phase angle which is a fraction of $2\pi$. The generated signals are separately recorded and transformed by inverse phase shifting before being added or stacked in a conventional manner.

5 Claims, 2 Drawing Figures

METHOD OF SEISMIC EXPLORATION

BACKGROUND OF THE INVENTION

1. Field of the Invention

Briefly, this invention concerns seismic exploration in general. More specifically, it deals with a method that concerns the specialized type of seismic exploration which employs a vibrator-type of generator to create the seismic energy.

2. Description of the Prior Art

The invention relates to a method of suppressing noise trains occurring in a vibrator-type seismogram due to harmonics of the vibrator-type signal which, for instance, may be caused by non-linear effects in the hydraulic of the vibrator and/or by the non-linear reaction of the ground to the oscillation of the vibrator plate.

In seismic exploration operations which use vibrators, there are relatively long signals generated. These long signals (hereinafter called "sweeps") are usually several seconds in duration, of constant amplitude, and with monotonously increasing or decreasing frequency. The technical terms for describing which way the frequency is changing, are "unsweep" and "downsweep" respectively. Such long signals are transmitted into the subsurface by means of one or more vibrators. The signals reflected from changes in the elastic properties connected with the boundaries of geological formations, are recorded by means of geophones located on the earth's surface.

A whole series of identical sweep signals (16, for example) are emitted one after the other to improve the signal/noise ratio. The elementary vibrator-type seismograms (hereinafter called elementary seismograms) are individually recorded. Then they are added giving the final vibrator-type seismogram. However, because the signals are several seconds long the reflections from successive interfaces of geological formations overlap. Consequently, in order to interpret the vibrator-type seismogram in the same manner as a conventional dynamite seismogram where the signal is a short pulse, the long sweep signals occurring in the vibrator type seismogram must be compressed to short signals. This is done by correlating the final vibrator-type seismogram with the sweep signal.

Because of the non-linear reaction of the ground to the vibration of the vibrator base plate and/or because of the non-linearity in said vibrator drive, the emitted signal is not only the proper sweep signal but also contains its harmonics. In correlating said vibrator-type seismogram these harmonics lead to asymmetrical secondary lobes which occur with upsweeps before the main pulse (precursor or forerunner) and with downsweeps after the main pulse (tail). The n-th harmonic of a T-seconds long downsweep linearly decreasing from the frequency $f_o$ to the frequency $f_u$ leads to tails that arrive from $t_1$ to $t_2$ seconds after the main pulse, $$t_1 = (n-1) \, Tf_u/(f_o-f_u)$$

$$t_2 = (n-1) \, Tf_o/[n(f_o-f_u)]$$

Therefore, $f_o$ must be greater than $nf_u$. Hence with a 60/12 Hz downsweep, tails are possible due to harmonics up to the fourth order.

The tails occurring with downsweeps are particularly disturbing since they interfer with later occurring weaker reflections whereas the precursors connected with upsweeps are less disturbing as they interfer with earlier, usually stronger, reflections. The advantage of the downsweeps is to be seen in that they are less demanding on the vibrators, particularly at lower frequencies, and that synchronous operation of the vibrators at low frequencies is considerably easier to achieve.

In order to suppress the even harmonics in said sweep signal, Sorkin (U.S. Pat. No. 3,786,409) suggested a method described as "inverted stacking" the essential feature of which is that only one half of the elementary seismograms are generated with the proper sweep. The other half of the elementary seismograms are generated with a sweep which has the opposite polarity, and simultaneously the polarity of the seismic data at the input of the amplifying/recording system is reversed. The elementary seismograms resultant therefrom are added up as usual (vertically stacked).

That prior method suppressed or at least heavily reduced only the even harmonics. On the other hand the method according to this invention suppresses odd harmonics also.

Consequently, it is an object of this invention to provide a method wherein regard to the aforementioned type of seismic exploration method, harmonics of the emitted sweep signal may be suppressed up to any order desired.

SUMMARY OF THE INVENTION

Briefly, the invention concerns a method for suppressing noise trains occurring in a vibrator-type semismogram due to hamonics of the generated seismic sweep signals. The method comprises the steps of generating a predetermined number of sweep signals in sequence with the phase of each being shifted relative to the preceding one by a predetermined constant phase angle less than $2\pi$. It also comprises controlling a corresponding number of vibrators to generate a corresponding number of said seismic sweep signals, and recording said seismic sweep signals after receipt thereof following transmittal through the earth.

Again briefly, the invention concerns a method of seismic exploration which comprises generating a signal of frequency changing monotonously with time, and supplying said signal to a transducer who's mechanical output is positioned to transmit a mechanical vibratory signal to the earth in response to receipt of said signal by said transducer. It also comprises receiving said mechanical vibratory signal transmitted through the earth, and recording the received mechanical vibratory signal. Also, it comprises repeating the foregoing steps a predetermined number of times in sequence with the phase of the generated signal shifted relative to the prior signal by a fixed phase angle which is a fraction of two pi, and transforming said recorded signals by inverting said fixed phase shifts in order to rephase the recorded series of signals prior to adding them together to produce a composite record.

BRIEF DESCRIPTION OF THE DRAWINGS

The foregoing and other objects and benefits of the invention will be more fully set forth below in connection with the best mode contemplated by the inventor of carrying out the invention, and in connection with which there are illustrations provided in the drawings, wherein.

DESCRIPTION OF THE PREFERRED EMBODIMENT

Figure 1:
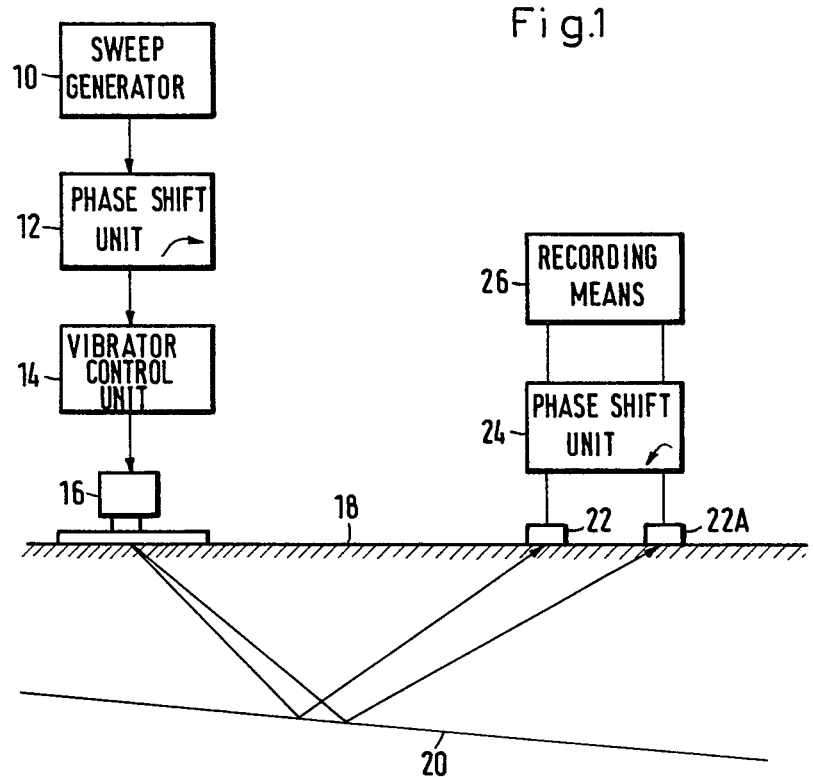
FIG. 1 illustrates a typical arrangement for implementing the invention.

Referring now to FIG. 1, it describes a typical arrangement for the implementation of the invention. A sweep generated in a sweep generator 10 is supplied to a phase shifting unit 12. Here, a constant, frequency independent phase shift is applied to the sweep. This phase shifted sweep is supplied to a vibrator control unit 14. A vibrator 16 is controlled by the unit 14 and the vibrator 16 impresses a signal onto the earth's surface which is indicated by reference numeral 18. The earth'-surface, of course, propagates the signals into the subsurface. Reflections from an interface 20 are picked up by a multitude of detectors, e.g. two seisomters 22 and 22A. The output of these detectors is fed to a phase shift unit 24 analogous to the unit 12. As indicated by the reversed arrow shown on the unit 24, it reverts the phase shift performed by the unit 12. The reverse phase shifted seismic signals are then recorded on any suitable recording means 26.

Figure 2:
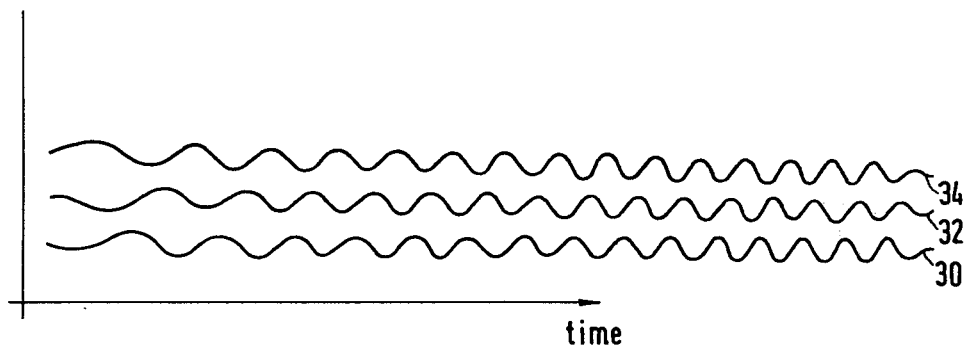
FIG. 2 illustrates the relationship of the signals for a series of three sweeps.

FIG. 2 indicates schematically the form of the sweeps if the series of sweeps consists of three different signals. In this case M=3 and each signal is phase shifted with respect to the previous one by a phase angle of $2\pi/3 = 120°$. This is, a signal 32 is phase shifted by 120° with respect to a signal 30, whereas a signal 34 is phase shifted by 120° with respect to the signal 32 and phase shifted by 240° with respect to the signal 30.

This invention concerns an improvement on sweep signal seismic exploration of the type shown and described in a U.S. Pat. No. 3,786,409 patented Jan. 15, 1974, and the disclosure thereof is herein incorporated by reference. The object of this invention is achieved by providing a method for suppressing noise trains occurring in a vibrator-type seismogram due to harmonics of the sweep signal. It is characterized in that for producing a vibrator-type seismorgram a series of M sweep signals is provided. Each of these sweep signals is shifted against the preceding sweep signal by a fixed phase angle equal to a fraction of $2\pi$, and each of the different sweep signals of this series is emitted at least once. Also, the elementary seismorgrams produced by means of these sweep signals are recorded in a manner known per se.

In this series of M sweep signals, the above mentioned phase angle is $2\pi/M$ and the second sweep signal is thus shifted against the first sweep by the phase angle $2\pi/M$. Furthermore, the third sweep signal is shifted against the second sweep by the phase angle $2\pi/M$ and against the first sweep by the phase angle $4\pi/M$. Generally, the phase of the $k$-th sweep signal of the series of M sweep signals is shifted against the phase of said first sweep signal by $2\pi(k-1)/M$.

The sequence according to which the sweep signals of one series are being emitted, does not depend on the numbering as mentioned above. If M is even numbered, i.e. has the factor 2, it may, for instance, be convenient to emit the sweep signals in order of succession of 1, $M/2+1$, 2, $M/2+2$, 3, ... If M has the factor 3, a possible order of succession may be the following: 1, $m/3+1$, $2M/3+1$, ..., $M/3+2$, $2M/3+2$, ....

Since all the sweep signals of this series are different, the recorded elementary seismograms cannot, as usual, be simply added (vertically stacked). Rather, by means of a transformation they first havt to be brought into the form they would have had they been generated by the same signal. The suppression of the harmonics is based on the fact that, by this transformation, the signal components present in the seismogram on account of non-linear effects are being transformed in another way than the proper signal. Due to particular choice of phase shift, a large portion of the signal components provided by the non-linearities nuetralize each other when adding up the elementary seismograms following the said transformation.

In order to bring all elementary seismograms into that form they would have if they had been generated by the first sweep signal of that series they have to be subjected to a transformation which is the inversion of the transformation used to provide the sweep signals of the series following the first sweep signal. According to Sorkin's method (U.S. Pat. No. 3,786,409) the series consists of two sweep signals (M = 2) the second signal of which if provided by reversing the polarity (sign) of the first. This transformation is to be revoked before the elementary seismograms provided from the two sweep signals of the series may be added, i.e. the polarity (sign) of the elementary seismograms generated by the second sweep signal must be reversed.

When M>2, the transformation is somewhat more complicated. Down to frequencies of a few Hertz, shifting of the phase of a sweep signal by $2\pi/M$ may be achieved with sufficient accuracy by a transformation L which has the following form in the frequency domain (indicated by subscript$\omega$):

$$L\omega = \begin{matrix} e^{2\pi i/M} & \omega > 0 \\ e^{-2\pi i/M} & \omega < 0 \end{matrix}$$

Also in the frequency domain, the inverse transformation $L^-$ has the form:

$$L\omega^{-1} = \begin{matrix} e^{-2\pi i/M} & \omega > 0 \\ e^{2\pi i/M} & \omega < 0 \end{matrix}$$

Since the $k$-th sweep signal of the series was produced by $(k-1)$ fold application of the transformation L to the first sweep signal, $(k-1)$ fold applications of the inverse transformation $L^-$ (to the elementary seismograms provided by this sweep signal) will — with the exception of non-linear effects — bring them into the form they would have if they had been generated by the first sweep signal of the series.

Sometimes, however, it is more convenient to bring all of the elementary seismograms into the form they would have if they had all been generated by the last sweep signal of the series. Then a method may be used that corresponds to Horner's scheme for computing a polynomial. In that case, e.g. first a sweep signal is emitted. Transformation L is applied to the elementary seismogram generated by this sweep so that is has the form — with the exception of non-linear effects — it would have if it had been generated by the sweep signal shifted by $2\pi/M$. Thereafter, the sweep signal shifted by $2\pi/M$, is emitted, the elementary seismogram provided by said signal is added to the transformed first elementary seismogram, and the sum is again transformed so that it has — again with the exception of non-linear effects — the form it would have if both elementary seismograms forming the sum had been provided by the third sweep signal. The cycle terminates as soon as the last sweep signal has been emitted and the elementary seismogram generated by said signal has been added to the already present sum.

The transformation L is, of course, not restricted to the frequency domain. Within the time domain (indicated by a subscripted $t$) the transformation has the form of a convolution and may be expressed in the following form as applied to the function $f(t)$:

$$L_t = \{f(t)\} = \cos(2\pi/M)f(t) - \sin(2\pi/M) H\{f(t)\},$$

i.e. to the function $f(t)$ itself multiplied by $\cos(2\pi/M)$, and the Hilbert transformation of $f(t)$ multiplied by $\sin(2\pi/M)$. In the same way $$L_t^{-1}\{f(t)\} = \cos(2\pi/M)f(t) + \sin(2\pi/M)H\{f(t)\}.$$

The transformation may be avoided by first correlating each elementary seismogram with the corresponding sweep signal and stacking the correlated elementary seismograms.

The previously mentioned principle underlying this kind of harmonics suppression, is elucidated in the following. The sweep signal is represented by $\cos \Phi (t)$, $\Phi (t)$ being a monotonously increasing or decreasing function of time which, for the downsweep, has the general form:

$$\Phi(t) = 2\pi[f_o t - (f_o - f_u) T^2/(2T)] + \Phi_o$$

As before $f_u$ and I $f_o$ denote the lower and the upper frequency limits, respectively, of the sweep signal. Also, T stands for the signal duration. $\Phi_o$ is any desired initial phase. For an upsweep $f_u$ and $f_o$ are being exchanged.

Non-linear effects lead to ground motion $V(t)$ which is not identical with the signal used for controlling said vibrators, but can be represented by a power series of the signal:

$$V = a_1 \cos\Phi + a_2 \cos^2\Phi + a_3 \cos^3\Phi + a_4 \cos^4\Phi + \ldots = \Sigma_n a_n \cos^n\Phi.$$

For simplification of notation, the arguments of $\Phi (t)$ and $V(t)$ have been omitted. Furthermore, here and in the following the summation is understood to extend from 1 to $\infty$ unless indicated otherwise. This power series may be transformed into a series of harmonics:

$$V = A_o + A_1\cos\Phi + A_2\cos 2\Phi + A_3\cos 3\Phi + A_4\cos 4\Phi + \ldots = A_o + \Sigma_n A_n \cos(n\Phi),$$

where, for example, $A_o = (\tfrac{1}{2})a_2 + (\tfrac{3}{8})a_4 + \ldots$ $A_1 = a_1 + (\tfrac{3}{4})a_3 + \ldots$ $A_2 = (\tfrac{1}{2})a_2 + (\tfrac{1}{2})a_4 \ldots$ Term $A_o$ corresponds to a constant displacment and is suppressed in the following.

Shifting the sweep signal phase by $2\pi(k-1)/M$, leads to a ground motion described by $$V_k = \sum_n A_n \cos[n \Phi + 2\pi n(k-1)/M] =$$

$$= \sum_{r=0}^{\infty} \sum_{s=1}^{M} A_{rM+s} \cos[(rM+s)\Phi + 2\pi s(k-1)/M].$$

A $(k-1)$-fold application to this signal of the transformation $L^-$ defined by $$L^- \{\cos[(rM+s)\Phi + 2\pi s(K-1)/M]\} =$$

i.e. a phase shift by $-2\pi/M$, leads to $$[L^{-1}]^{(k-1)}\{V_k\} = L^{-k+1}\{V_k\} =$$

$$= \sum_{r=0}^{\infty} \sum_{s=1}^{M} A_{rM+s}\cos[(rM+s)\Phi + 2\pi(s-1)(k-1)/M]$$

$$= \sum_{r=0}^{\infty} A_{rM+1}\cos[(rM+1)\Phi] +$$

$$+ \sum_{r=0}^{\infty} \sum_{s=2}^{M} A_{rM+s}\cos[(rM+s)\Phi + 2\pi(s-1)(k-1)/M].$$

Addition of the transformed elementary seismogram results in $$\sum_{k=1}^{M} L^{-k+1}\{V_k\} = MA_1\cos\Phi + M\Sigma A_{rM+1}\cos[(rM+1)\Phi] +$$

$$+ \sum_{r=0}^{\infty} \sum_{s=2}^{M} A_{rM+s} \sum_{k=1}^{\infty} \cos[(rM+s)\Phi + 2\pi(s-1)(k-1)/M].$$

At the last sum is identically zero, $$\sum_{k=1}^{M} L^{-k+1}\{V_k\} =$$

$$= M\{A_1\cos\Phi + A_{M+1}\cos[(M+1)\Phi] + A_{2M+1}\cos[(2M+1)\Phi] + \ldots\};$$

that means that all hamonics after the first up to and including the $M$-th harmonic have cancelled each other. After the $(M+1)$-th harmonic, all harmonics up to the $(2M+1)$-th harmonic are missing.

While a particular embodiment of the invention has been described above in considerable detail in accordance with the applicable statutes, this is not to be taken as limiting the invention but merely as being descriptive thereof.

I claim:
1. Method of seismic exploration comprising:
   generating a sweep signal of frequency changing monotonously with time
   supplying said sweep signal to a transducer whose mechanical output is positioned to transmit a mechanical vibratory signal to the earth in response to receipt of said sweep signal by said transducer,
   receiving said mechanical vibratory signal transmitted through the earth,
   recording the received mechanical vibratory signal,
   repeating the foregoing steps at least three times in sequence with the entire phase of each generated signal shifted relative to the prior signal by a fixed phase angle which is a fraction of two pi, and
   transforming said recorded signals by inverting said fixed phase shifts in order to rephase the recorded series of signals prior to adding them together to produce a composite record.
2. Method according to claim 1 also comprising the step of cross correlating said composite record.
3. Method for suppressing noise trains occurring in a vibrator-type seismogram due to harmonics of the generated seismic sweep signals, comprising the steps of
   generating at least three sweep signals in sequence with the entire phase of each being shifted relative to the preceding one by a predetermined constant phase angle less than $2\pi$, controlling a vibrator a corresponding number of times to generate a corresponding number of said seismic sweep signals, recording said seismic sweep signals after receipt thereof following transmittal through the earth adding said recorded seismic sweep signals while inversely shifting the phase to add them all in phase to produce a composite record, and cross correlating said composite record.

4. Method according to claim 3, also comprising the step of
subjecting each of said recorded seismic sweep signals to a Fourier transform before said step of adding while inversely shifting the phase.

5. Method according the claim 4, wherein said step of cross correlating, comprises
muliplying said Fourier transform composite record by the Fournier transform of the sweep to be used for correlation and subjecting said product to a subsequent inverse Fourier transform.

* * * * *

UNITED STATES PATENT AND TRADEMARK OFFICE
CERTIFICATE OF CORRECTION

PATENT NO. : 4,042,910.

DATED : August 16, 1977

INVENTOR(S) : Eike Rietsch

It is certified that error appears in the above-identified patent and that said Letters Patent are hereby corrected as shown below:

In the specification col. 3, line 66 "m/3" should read -- M/3 --; col. 4, lines 35 and 36 should be modified to read $$L_\omega = \begin{matrix} e^{2\pi i/M} & \omega > 0 \\ e^{-2\pi i/M} & \omega < 0 \end{matrix}$$

col. 4, line 38 "L-" should read -- $L^{-1}$ --; col. 4, lines 42 and 43 should be modified to read $$L^{-1}_\omega = \begin{matrix} e^{-2\pi i/M} & \omega > 0 \\ e^{2\pi i/M} & \omega < 0 \end{matrix}$$

col. 4, line 47 "L-" should read -- $L^{-1}$ --; col. 4, lines 47 and 48 should have the "()" omitted; col. 5, line 11 the first sign "=" should be omitted; col. 5, line 30 in the mathematical equation the symbol "$T^2$" should read -- $t^2$ --; in col. 6, lines 2 and 4 the "L-" should read -- $L^{-1}$ --; col. 6, line 26 "At" should read -- As --.

Signed and Sealed this

Twentieth Day of June 1978

[SEAL]

Attest:

RUTH C. MASON
*Attesting Officer*

DONALD W. BANNER
*Commissioner of Patents and Trademarks*